United States Patent [19]

Jopp

[11] 3,977,708
[45] Aug. 31, 1976

[54] PLASTIC TUBE FITTING AND JOINT
[75] Inventor: Gerhard P. Jopp, Wayzata, Minn.
[73] Assignee: Fluoroware, Inc., Chaska, Minn.
[22] Filed: Sept. 11, 1975
[21] Appl. No.: 612,290

[52] U.S. Cl. .................................. 285/342; 285/423
[51] Int. Cl.² .......................................... F16L 19/00
[58] Field of Search ........ 285/341, 342, 343, 382.7, 285/423, 247

[56] References Cited
UNITED STATES PATENTS

| | | | |
|---|---|---|---|
| 1,989,674 | 2/1935 | Boas et al. | 285/342 |
| 2,474,178 | 6/1949 | Wurzburger | 285/342 |
| 2,755,110 | 7/1956 | Jacobs | 285/423 X |
| 3,006,558 | 10/1961 | Jacobs | 285/423 X |
| 3,195,933 | 7/1965 | Jacobs | 285/342 X |
| 3,893,716 | 7/1975 | Moreirus et al. | 285/341 X |

FOREIGN PATENTS OR APPLICATIONS
458,408   7/1949   Canada.............................. 285/342

Primary Examiner—Dave W. Arola
Attorney, Agent, or Firm—H. Dale Palmatier

[57] ABSTRACT

An injection molded fluorocarbon resin plastic fitting for connection with plastic tubes preferably of fluorocarbon resinous material, the fitting including a sleeve with internal tube-receiving bore flared at the end of the sleeve, a plastic nut with a ferrule integral thereof and with a conical wedging shape identical to the wedging shape of the flared sleeve inner periphery, the flared inner periphery of the sleeve also having a sharp angled conical surface deforming the ferrule when tightened and embedding the ferrule in the tubing which is preferably grooved.

11 Claims, 10 Drawing Figures

PLASTIC TUBE FITTING AND JOINT

BACKGROUND OF THE INVENTION

Handling of various chemical solutions at a wide range of temperatures requires the use of very strong and chemically inert pipes, tubes and fittings. Plastic materials which may be injection molded and extruded include a broad range of materials which are suitable for making such tubes and fittings. Materials such as fluorocarbon resins include a number of materials useful for this purpose, and a material known as perfluoroelkoxy (sold under the trademark PFA) is ideally suited to handle such solutions. Attaching tubes or pipes of certain materials to fittings has presented some problems because of the slippery nature of the material incorporated into the pipes and fittings. As a result, difficulty has been experienced in producing joints between the tubes and fittings which will withstand substantial pressures and physical tension, and avoid leaking or separation.

Previously known fittings have been primarily designed to be used with metal pipes, or have been excessively complicated for accomplishing the purpose intended. Typical of such prior fittings are found in U.S. Pat. No. 2,755,110, which is made of nylon but primarily adapted to metal tubes; and in U.S. Pat. No. 3,501,177 which, in addition to the body and nut, also requires a separate ferrule and also a split ring.

SUMMARY OF THE INVENTION

This invention provides for the simple and quick attachment of a plastic tube with extremely slippery characteristics to a fitting of the same or similar material. The fitting includes only the body and a nut which is threaded onto the body of the fitting. A ferrule, preferably carried on the nut and embracing the tube, has a tapered (15°) periphery which fits into a similarly tapered annular recess on the end of the fitting body. The end of the ferrule is drawn against the tube as the nut is threaded along and onto the body. The recess on the end of the body has a second, more steeply tapered (45°) annular wedging surface driving the tapered ferrule inwardly against and into the tube as the nut and ferrule are threaded further along the body of the fitting. The nut mounted ferrule is deformed into smaller diameter and protrudes into and deforms the plastic tube to seal and grip the tube in the fitting. The ferrule also drives the tube further into the fitting body to seal the end of the tube against the deformable tapered seat in the fitting body.

Strength to resist separation of the tube from the fitting is materially increased by means of a shallow groove in the outer periphery of the tube adjacent the recess of the fitting body. The tapered ferrule is driven into the groove as the ferrule is moved along the second more steeply tapered wedging surface of the annular recess. The likelihood of separation of the tube is thereby minimized and the tube is also secured tightly against the body seat to maintain the seal and prevent leaking.

DETAILED DESCRIPTION OF THE INVENTION

Figure 5:
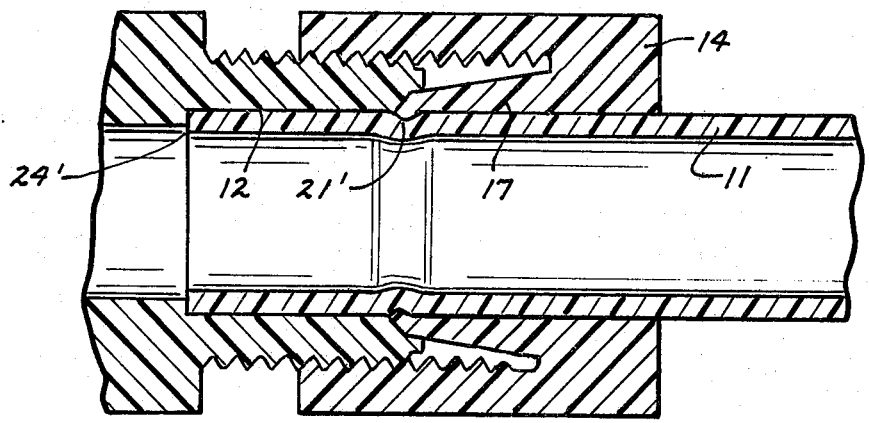
FIG. 5 is a longitudinal section view, similar to FIG. 3, but after final tightening has been accomplished.
Figure 6:
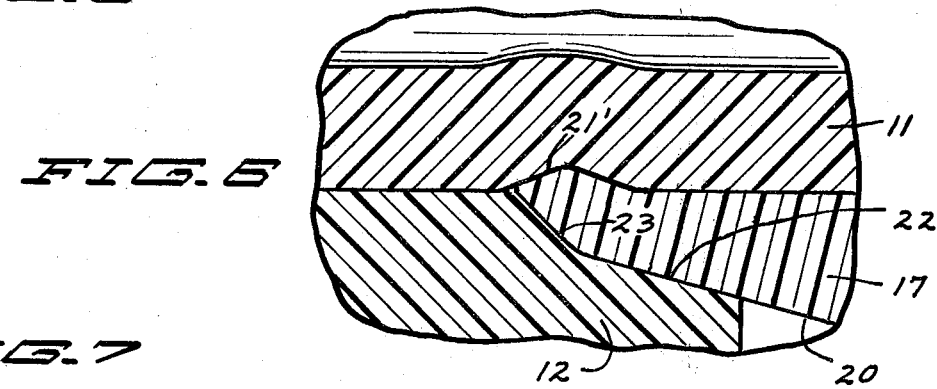
FIG. 6 is a greatly enlarged detail section view substantially illustrating the relationship between the fitting body, ferrule and tube after final tightening has been accomplished.
Figure 7:
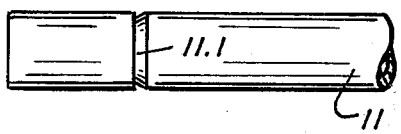
FIG. 7 is an elevation view of a modified tubing peripherally grooved for application to the fitting.
Figures 8, 9:
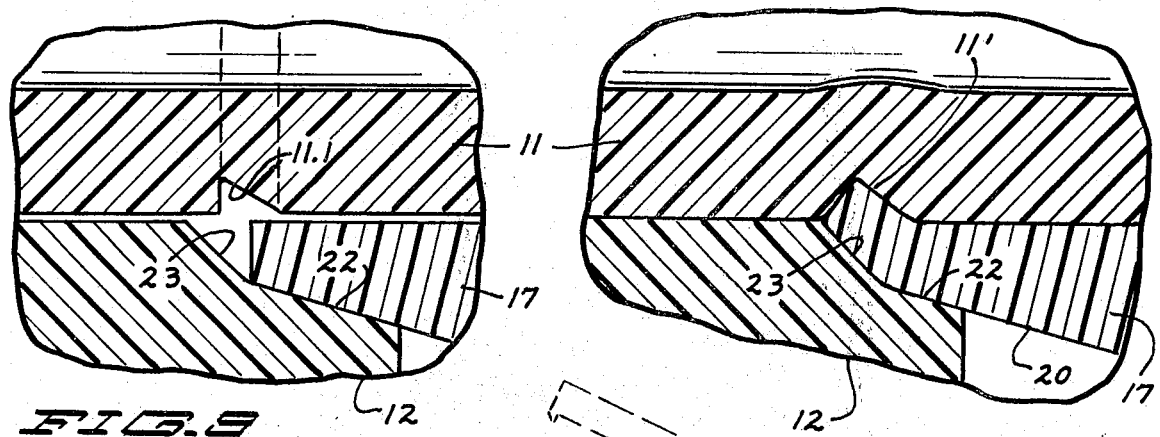
FIG. 8 is an enlarged detail section view illustrating the peripherally grooved tubing in the fitting prior to final tightening.
FIG. 9 is a view similar to FIG. 8, but subsequent to final tightening of the nut onto the fitting body.

One form of the fitting is illustrated in the drawings and is described herein in connection with two different forms of the joint between the fitting and tube, one form of joint being illustrated in FIGS. 1–6 and another form of the joint being illustrated in FIGS. 7–9.

The fitting indicated by the numeral 10 is the same for both forms of joints, which differ from each other principally in that the tube 11 is smooth surfaced in FIGS. 1–6, and has a peripheral groove 11.1 in FIGS. 7–9.

The fitting 10 is illustrated in the form of a straight union or coupling between adjacent lengths of tubing 11. The fitting could take any of a number of other forms, such as an elbow, union tee, panel mount or coupling, or any of a number of other similar type of fittings. This fitting 10 contemplates that another tubing will be connected to its opposite end as illustrated in dotted lines in FIG. 1. The fitting 10 includes a body portion 10.1, the exterior periphery of which is substantially hexagonally shaped to provide a number of wrench-engaging surfaces 10.2. The fitting also has a pair of body sleeves 12 formed integrally of and in one piece with the body portion 10.1. The sleeves 12 are provided with exterior threads 13 all along their lengths onto which a nut 14 is threaded. The nut 14 also has a hexagonal periphery defining a number of flat surfaces 15 for receiving a wrench for tightening and loosening the nut.

The nut 14 has threads 16 on its interior periphery for fitting onto and threading along the threads 13 of sleeve 12. Nut 14 also has a ferrule 17 molded integrally and in one piece with the remainder of the nut to be rotated and moved longitudinally along the sleeve 13 with the nut.

The ferrule 17 defines an interior bore 18 which is substantially identical in size to the bore 19 at the inner periphery of sleeve 12 for receiving the tube 11 in snug fitting relation.

The ferrule 17 has a conical outer peripheral surface 20 which has a gradual wedging taper converging toward the threaded end of the nut 14 and toward the sleeve 12 when assembled.

It will be noted that the ferrule 17 has a rather blunt or squared off end surface 21 adjoining both the conical outer peripheral surface 20 and the cylindrical bore 18.

The inner periphery of the body sleeve 12 is flared adjacent the outer end 12.1 thereof, and the flared portion of the periphery defines two distinct conical surfaces 22 and 23. The conical ferrule-wedging surface 22 which is adjacent the terminal end 12.1 of the sleeve, has the same angular orientation or taper as the conical surface 20 of ferrule 17, and the conical surface 22 of the sleeve is dimensioned so that the ferrule will engage the conical surface 22 in a snug mating fit while the end 21 of the ferrule remains in spaced relation with the other ferrule-deforming surface 23.

In the form illustrated, the conical peripheral surface 20 of the ferrule and the conical wedging surface 22 of the sleeve have the same angular orientation with respect to the bore 19 of the sleeve, and both are oriented at approximately 15° with respect to the longitudinal orientation of the bore 19. While it has been found quite satisfactory to maintain a 15° orientation or taper at the conical surfaces 20 and 22, the gradual taper or orientation of these surfaces 20 and 22 with respect to the longitudinal bore 19 could be within the range of approximately 10° to 30°.

It will be recognized that the conical ferrule-deforming surface 23 on sleeve 12 has a distinctly different angular orientation than the ferrule-wedging surface 22. The conical surface 23 has a significantly steep-angled taper with respect to the longitudinal orientation of bore 19 and also with respect to the tapered conical surface 22 so as to deform the end of ferrule 17 when the ferrule is moved along the sleeve by the nut and direct and drive the end of ferrule 17 into the outer periphery of tube 11, substantially as illustrated in FIGS. 5 and 6, and also in FIGS. 8 and 9.

In the form illustrated, the ferrule-deforming conical surface 23 has an orientation of approximately 45° with respect to the longitudinal orientation of bore 19, and an angular orientation of approximately 30° with respect to the tapered conical surface 22. While the angular orientation illustrated is found to be satisfactory, the angular orientation of the conical surface 23 may be varied somewhat within the concept of the present invention within the range of 30° to 60° with respect to the longitudinal orientation of bore 19.

It is also important to note that the sleeve 12 has an annular and conically tapered shoulder or seat 24 against which the end of tubing 11 bears. The shoulder or seat 24 is tapered at a sharp angle, convergently toward the outer end of sleeve 12.

Figure 1:
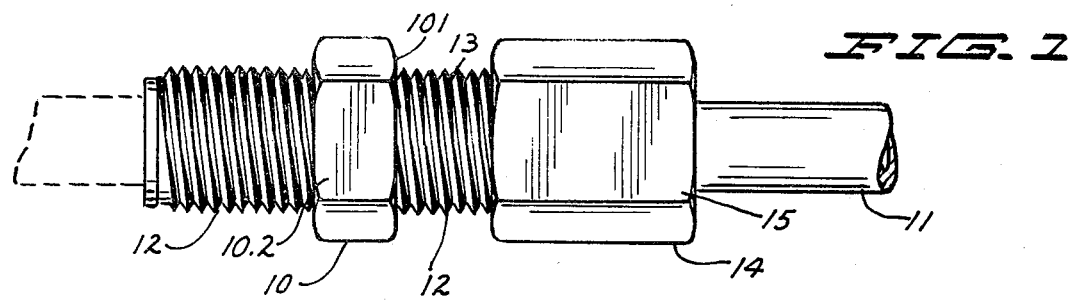
FIG. 1 is an elevation view of a typical fitting attached to a tube.
Figure 2:
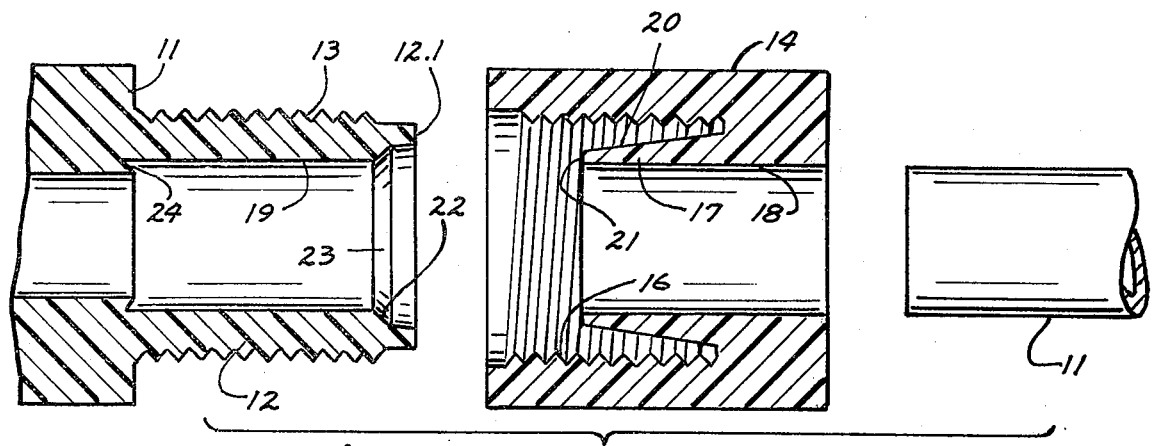
FIG. 2 is a longitudinal section view through the disassembled parts of the fitting.
Figure 3:
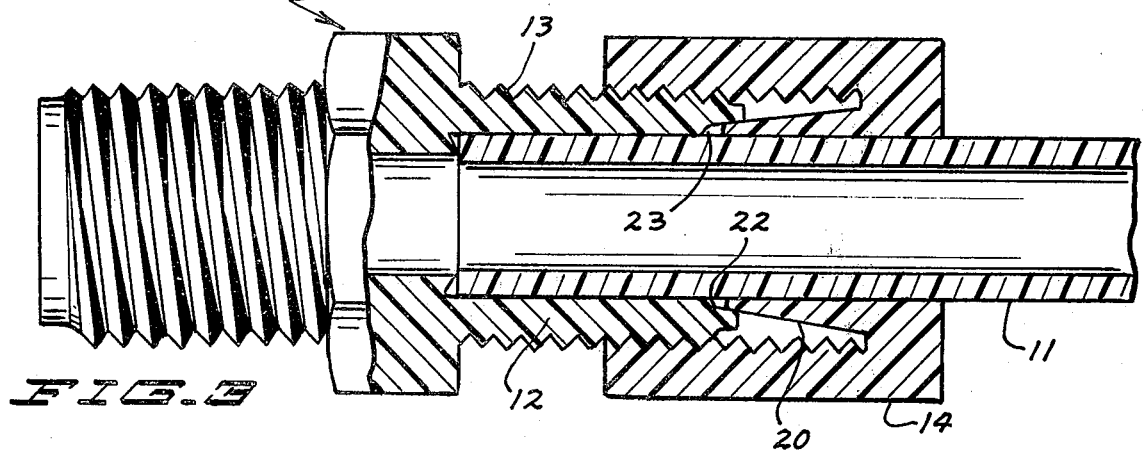
FIG. 3 is a longitudinal section view through the tube and fitting in assembled condition prior to the final tightening.
Figure 4:
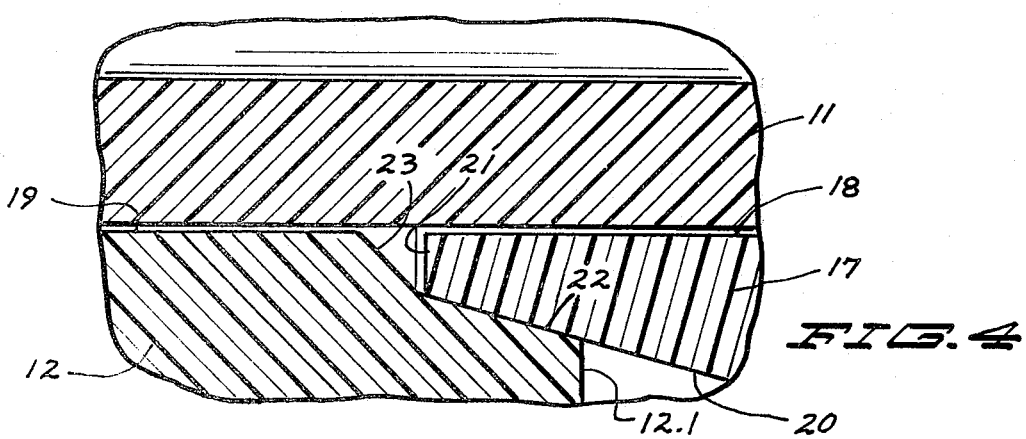
FIG. 4 is a greatly enlarged detail section view of the relationship between the ferrule, fitting body and tube immediately prior to final tightening.

It will be recognized in FIGS. 3 and 4 that when the fitting and tube are assembled, the end of tube 11 is inserted into the bore 19 of the sleeve until the end of the tube bears against the sealing shoulder or seat 24 of the fitting. The nut is slipped along the tubing 11 until the threads in the nut fit with the threads on the sleeve 12, and initially, the nut 14 is turned by hand until the nut becomes finger-tight on the fitting or sleeve 12. At this time, the conical peripheral surface 20 of the ferrule 17 bears firmly against the similarly contoured conical wedging surface 22 of the sleeve 12. The exterior periphery of the tube 11 fits snugly within the sleeve 12, and with such small clearance as to make it possible to readily receive the tubing in the sleeve.

In order to establish a sealed and physically strong connection between the fitting 10 and the tube 11, the nut 14 is thereafter turned along the threads to advance the ferrule along the conical wedging surface 22 of the sleeve and thereafter along the steep angled conical ferrule-deforming surface 23. As the ferrule 17 advances in the sleeve 12, the blunt end of the ferrule is deformed and directed inwardly against the outer periphery of tube 11, which has several effects. The blunt end of the ferrule 17 is embedded into the outer peripheral surface of the tube 11. The tube 11 is advanced further into the sleeve 12 so as to deform the seat 24 and establish a sealed relation between the tube and the fitting at the engagement between the end of the tubing and the seat 24 as indicated at 24' in FIG. 5. The end of the ferrule 17, which engages and is deformed and also deforms the periphery of the tube 11 produces a sealed relation between the ferrule and the tube as indicated at 21' in FIGS. 5 and 6.

The condition illustrated in FIGS. 5 and 6 is the condition which is normally expected in the situation where the fitting 10, including the nut 14 as well as the sleeve 12, are both injection molded of a suitable fluorocarbon resin plastic type material such as perfluoroelkoxy, and the tube 11 is formed of a similar type fluorocarbon resin material, although it may be slightly different.

In the joint illustrated in FIGS. 7–9, the same identical fitting 10 is utilized, but the joint illustrated utilizes a shallow groove 11.1 formed in the outer peripheral surface of the tube 11. The groove 11.1 is spaced from the end of tube 11 such that when the end of the tube bears against the sealing shoulder 24, the groove 11.1 is located adjacent the flared portion of the inner periphery of sleeve 12 and preferably adjacent the steep-angled conical surface 23. In this form of the joint, threading of the nut along the sleeve causes the ferrule 17 to revolve in the sleeve, as in the other form of the invention and to be deformed inwardly along the steep-angled conical surface 23 so as to enter the groove 11.1 of the tube and result in a deformation of the tube, adjacent the groove 11.1 and also a deformation of the end of the ferrule so that the ferrule is rather deeply embedded into the tube 11 to produce a fluid-tight seal at 11' as indicated in FIG. 9.

It will be recognized that in both forms of joints, as illustrated in FIGS. 6 and 9, the inner periphery of the wall of tube 11 is slightly deformed, but in most every instance this slight deformation is insignificant. The ferrule 17 is substantially more deeply embedded into the tube wall in FIG. 9 than in FIG. 6, but in both instances significant strength between the tube and fitting results.

Figure 10:
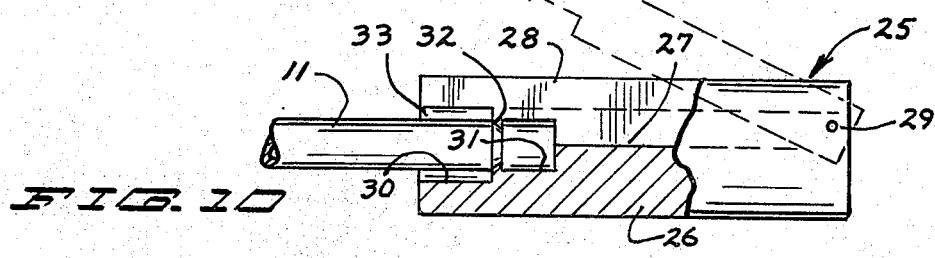
FIG. 10 is an elevation view, partly broken away and shown in section, of a tool readily adapted to producing the peripheral groove at the proper location at the end of the tubing.

In completely seating the ferrule against the sleeve 12, it is important that the nut 14 be turned on the thread until the nut is wrench-tight, that is to say, until the wrench which turns the nut will slip from one pair of flat surfaces to the adjoining pair of flat surfaces by deformation of the outer surface of the nut. In both forms of the joint, it has been found that maximum strength can be obtained in the joint by advancing the nut along the sleeve one and one-half to two complete turns. If the nut is not adequately tightened onto the sleeve 12, the strength of the resulting joint is materially reduced. A tool for forming the groove 11.1 in the tube is illustrated in FIG. 10 and is indicated in general by numeral 25. The tool comprises a cylindrical body member 26 having a radially oriented slide 27 extending throughout the full length of the body to receive and swingably mount a cutting blade 28 which is hinged to the body member on a pivot 29.

The body member 26 has a pair of concentric and axially aligned recesses or openings 30 and 31 in the end opposite pivot 29 for receiving the end of a length of tube. The recess 31 is of smaller diameter so as to receive a tube 11 of appropriate diameter. For larger tubes, the opening 30 has a larger diameter, and a suitable shoulder is provided at the end of opening 30 so as to stop the end of the tube at the proper location. Similarly, the bottom surface of opening 31 will stop the tube 11 at the proper location. The blade 28 has a cutting tooth 32 adjacent the opening 31 for cutting a properly shaped tapered groove 11.1 into the tube 11. The depth of the groove is controlled by the depth of projection of tooth 32, and by the stop relation between the longitudinal edge of blade 28 and the bottom of groove 27 in the body member 26. A second cutting tooth 33 is also provided on the blade 28 adjacent the opening 30 for producing a tapered groove in a larger size of tubing. Accordingly, if a small tubing is to be grooved, the tooth 32 will be utilized and the tooth 33 will be utilized for a larger size tube. It will be understood that when the tube is to be grooved, it is merely inserted into the opening of the body member 26, and the blade is swung inwardly so that the proper tooth will bear against the outer periphery of the tubing. When the tubing is manually rotated, the groove is readily formed by the cutting tooth.

The fittings described herein withstood very considerable amounts of fluid pressure without distortion. In most all of the tests carried out, the joint of FIG. 9 withstood all applied pressures until the tube ruptured. In tests utilizing tubes of 0.375 inches outside diameter and a wall thickness of 0.0625 inches, and made of a fluorocarbon plastic material such as that known by its trademark TEFLON, and with appropriately sized fittings of perfluoroelkoxy, the joint of FIG. 9, with the nut turned to approximately maximum tightness, withstood fluid pressures up to those indicated in the chart below:

| Joints Utilizing Grooved Tubes | |
|---|---|
| Withstood Pressures Up To, in psi | Temperature of Tube and Fitting |
| 380 | 250° |
| 460 | 200° |
| 850 | 73° |
| 1240 | 30° |
| 1200 | 0° |

At only 0° did separation occur between tube and fitting; in all other instances the tube ruptured before separation occured.

The joint utilizing the grooved tube of FIG. 9 also withstood up to 80 to 90 pounds force tending to pull the tube out of the fitting with no internal fluid pressure applied, at room temperature.

Similarly, the joint of FIGS. 5 and 6, with the nut tightened substantially to the maximum degree, withstood pressures in accordance with the table following:

| Joints Utilizing Ungrooved Tubes | |
|---|---|
| Withstood Pressures Up To, in Psi | Temperature of Tube and Fitting |
| 130 | 250° |
| 200 | 200° |
| 350 | 73° |
| 550 | 30° |
| 700 | 0° |

The ungrooved joint withstood fluid pressures up to these indicated, at which pressures separation occurred between the tube and fitting.

It will be recognized from this tabulated information that these joints according to the present invention provide a marked improvement in plastic fittings for the purpose of withstanding substantial fluid pressures at a wide range of temperatures up to 250°F.

It will be recognized that the fitting 10 may also be used with rigid tubes such as stainless steel, Pyrex, glass and similar materials, but the effectiveness of the fitting is somewhat reduced unless the rigid tubing utilized is provided with a groove similar to that illustrated in FIGS. 7 and 8.

It has been found that the fitting 10 may be reused with plastic tubing, and the effectiveness and strength against separation from the tubing is very nearly the same as for new fittings, particularly when used with the grooved tubing in the joint of FIGS. 7–9.

It will be seen that I have provided a new and improved injection molded plastic fitting readily attachable, detachable and reusable with plastic tubes and capable of withstanding separation from the tubes at very significant pressures by not only wedging the ferrule of the nut against the wall of the tubing, but also deforming the blunt end of the ferrule and driving the end of the ferrule into the tubing wall for deforming the tubing and both sealing and gripping the tubing wall thereby. The joint produced with tubing which is peripherally grooved markedly improves the operating and pressure-withstanding characteristics of the joint.

What is claimed is:

1. An injection molded plastic fitting for connection to a plastic tube, comprising:
   a molded plastic body sleeve having a threaded exterior and a longitudinal bore snugly receiving the end of the tube;
   molded plastic tube-clamping means including a threaded nut on the threaded exterior of the sleeve for longitudinal movement along the sleeve, and also including a ferrule integrally of and in one piece with the nut, the ferrule embracing the tube and driven longitudinally along the tube and sleeve by the nut, the ferrule having a blunt end and also having a conical outer peripheral surface with a gradual wedging taper converging toward the sleeve, the nut and ferrule having a smooth-surface inner bore,
   the body sleeve having a flared ferrule-receiving inner periphery between the bore and the end of the sleeve, the flared periphery having a conical ferrule-wedging surface adjacent the end of the sleeve and tapering along its length at a narrow angle relative to the body sleeve axis and tapering in the same direction as the conical surface of the ferrule, said flared periphery freely receiving the tapered ferrule substantially to the full length of said ferrule-wedging surface and thereafter snugly mating with the ferrule, and the flared periphery also having a conical ferrule-deforming surface adjacent the bore and with a steep angled taper obliquely oriented with respect to the ferrule-wedging surface of the flared periphery at a significant angle, the steep angled taper of the ferrule-deforming surface forming and directing the end of the ferrule inwardly of the bore and into embedded condition in the tube.

2. The fitting according to claim 1 and the sleeve and nut both being formed of perfluoroalkoxy.

3. The fitting according to claim 1 and the sleeve having a yieldable fluid-sealing seat against which the end of the tube bears, said seat being formed by an annular shoulder having a sharp angled inner edge to bear against and yield by engagement of the end of the tube thereon, the nut and ferrule carrying the tube endwise along the sleeve to seal the tube against said seat.

4. The fitting according to claim 1 and with respect to the longitudinal orientation of the bore, the conical peripheral surface of the ferrule being oriented at approximately 10° to 30°.

5. The fitting according to claim 1 and with respect to the longitudinal orientation of the bore, the conical ferrule-deforming surface of the sleeve being oriented at approximately 30° to 60°.

6. The fitting according to claim 4 and said conical ferrule surface being oriented at approximately 15°.

7. The fitting according to claim 5 and said conical ferrule-deforming surface being oriented at approximately 45°.

8. A joint between an injection molded plastic fitting and a plastic tube comprising:
   a molded resiliently yieldable plastic body sleeve on the fitting and having a threaded exterior and a longitudinal bore snugly receiving the end of the tube;
   molded plastic tube-clamping means including a resiliently yieldable threaded nut on the threaded exterior of the sleeve for longitudinal movement along the sleeve, and also including a ferrule integrally of and in one piece with the nut, the ferrule embracing the tube and driven longitudinally along the tube and sleeve by the nut, the ferrule having a conical outer peripheral surface with a gradual wedging taper converging toward the sleeve;
   the end of the tube having a peripheral groove in the exterior thereof and located within the sleeve;
   the body sleeve having a flared ferrule-receiving inner periphery between the bore and the end of the sleeve and adjacent the groove of the tube, the flared periphery having a conical ferrule-wedging surface adjacent the end of the sleeve and tapering along its length at a narrow angle relative to the body sleeve axis and tapering in the same direction as the conical surface of the ferrule, said flared periphery freely receiving the tapered ferrule substantially to the full length of said ferrule-wedging surface and thereafter snugly mating with the ferrule, and the flared periphery also having a conical ferrule-deforming surface adjacent the bore with a steep angled taper obliquely oriented with repsect to the ferrule-wedging surface of the flared periphery at a significant angle, the steep angled taper of the ferrule-deforming surface directing the ferrule inwardly of the bore and into the peripheral groove of the tube which is also deformed by the ferrule.

9. The joint according to claim 8 and the flared inner periphery of the sleeve being opposite the threaded exterior of the sleeve, the threaded nut embracing the threaded exterior of the sleeve opposite the flared inner periphery to confine the sleeve and ferrule against expansion to cause the ferrule to be deformed and embedded in the groove as the nut is threaded along the sleeve.

10. The joint according to claim 8 and the groove in the tube having sides angularly related to the outer peripheral surface of the tube.

11. A joint between a fitting and a tube, and both formed of perfluoroalkoxy, comprising:
   a molded plastic body sleeve on the fitting and having a threaded exterior and a longitudinal bore snugly receiving the end of the tube, the inner periphery of the sleeve having a tube-sealing shoulder surface against which the end of the tube bears in sealed relation;
   a molded plastic clamping nut having a ferrule formed in one piece and integrally thereof, the nut having a threaded interior on the threaded sleeve, and the ferrule being spaced inwardly and concentrically with the threaded interior, the nut and ferrule defining a longitudinal bore coaxial and aligned with the bore of the sleeve and snugly fitting on the tube, the ferrule having a conical outer peripheral surface with a gradual wedging taper converging toward the sleeve and spaced inwardly of the sleeve embracing threaded interior of the nut, the ferrule also having a blunt end adjoining the outer peripheral surface and the tube-embracing inner bore,
   the end of the tube having a peripheral groove in the exterior thereof and located within and adjacent the end of the sleeve, the groove having side walls in sharp angled relation with respect to the exterior surface of the tube, and
   the body sleeve having a flared ferrule-receiving inner periphery between the bore and the end of the sleeve and adjacent the groove of the tube, the flared inner periphery having a conical ferrule-wedging surface adjacent the end of the sleeve and having the same direction of gradual wedging taper as the conical peripheral surface of the ferrule, the similarly tapering conical surfaces of the sleeve and ferrule having coordinated dimensions to be freely joined together substantially to the full length of said ferrule-wedging surface of the flared periphery and thereafter mated together in a snug fit as the ferrule is inserted into the flared periphery of the sleeve, the flared periphery also having a conical ferrule-deforming surface adjacent the bore and with a steep angled taper obliquely oriented with respect to the ferrule-wedging surface of the flared periphery at a significant angle and converging in the same general direction as said ferrule-wedging surface, the ferrule-deforming conical surface initially being spaced from the blunt end of the ferrule as the ferrule engages the sleeve, and the steep angled taper of the ferrule-deforming surface directing the ferrule inwardly of the sleeve bore and into the peripheral groove of the tube which is also deformed by the ferrule, the nut embracing the sleeve to prevent outward expansion of the sleeve during inward deformation of the ferrule as the nut is threaded along the sleeve to produce a seal between the ferrule and the sleeve and to urge the tube firmly against the fluid sealing seat of the sleeve.

* * * * *